(12) United States Patent
Natarajan et al.

(10) Patent No.: US 9,268,754 B1
(45) Date of Patent: Feb. 23, 2016

(54) ADAPTIVE EDITING IN USER INTERFACE APPLICATIONS

(75) Inventors: Adarsh Natarajan, Kerala (IN); Viswanath Sankaranarayanan, Chennai (IN); Sairam Reddi, Tamilnadu (IN)

(73) Assignee: Amazon Technologies, Inc., Reno, NV (US)

( * ) Notice: Subject to any disclaimer, the term of this patent is extended or adjusted under 35 U.S.C. 154(b) by 837 days.

(21) Appl. No.: 13/565,544

(22) Filed: Aug. 2, 2012

(51) Int. Cl.
*H04N 1/40* (2006.01)
*G06F 15/00* (2006.01)
*G06K 1/00* (2006.01)
*G06K 15/02* (2006.01)
*G06F 17/24* (2006.01)

(52) U.S. Cl.
CPC .................................... *G06F 17/24* (2013.01)

(58) Field of Classification Search
USPC .................................................. 358/1.1–1.18
See application file for complete search history.

(56) References Cited

U.S. PATENT DOCUMENTS 8,782,552 B2 * 7/2014 Batman et al. ................ 715/780
9,058,539 B2 * 6/2015 Seikh

* cited by examiner

*Primary Examiner* — Douglas Tran
(74) *Attorney, Agent, or Firm* — Lowenstein Sandler LLP

(57) ABSTRACT

Systems and methods for improving automated processing of electronic media items are disclosed. In one embodiment, a computer system identifies a first set of regions of a page of an electronic media item, and a respective region type for at least one region of the first set, where the identification of the respective region type is based on one or more typographical features, historical data, and, optionally, the position and/or dimensions of the region. The computer system receives an identification by a user of a second set of regions of the page and a respective region type for at least one region of the second set, and then modifies the historical data when there is a difference between the regions and respective region types of the first set, and the regions and respective region types of the second set.

25 Claims, 7 Drawing Sheets

ADAPTIVE EDITING IN USER INTERFACE APPLICATIONS

BACKGROUND

Print media such as books, magazines, and newspapers are increasingly being consumed via electronic devices (e.g., notebook computers, tablets, smartphones, dedicated e-readers, etc.) in the form of electronic books (or "e-books"), electronic magazines, electronic newspapers, etc. A print media item may be converted to an electronic media item via scanned images of its pages. In some instances, optical character recognition (OCR) may be performed on the scanned images of pages to extract text and detect the layouts of the pages. This detection may not always be accurate and users often have to manually correct the layouts of the pages.

BRIEF DESCRIPTION OF THE DRAWINGS

Embodiments of the present disclosure will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Methods and systems are disclosed for automatically editing page layouts of an electronic media item (e.g., an electronic book [or "e-book"], an electronic magazine, an electronic newspaper, etc.) using patterns derived from prior editing actions of a user. When an electronic media item is created, pages of a print media item are scanned to create page images, which are then processed using optical character recognition (OCR) to extract text and layout recognition to detect the layouts of the pages. This detection may not always be accurate and users often have to manually correct the layouts of the pages by performing many repetitive actions. For example, the resulting layouts of the pages may include some regions that are incorrectly identified during the OCR processing, and the user may have to manually correct the layouts of all the pages of the electronic media item.

Embodiments of the present disclosure reduce the number of repetitive manual actions by deriving patterns from prior editing actions of a user and editing the page layouts automatically using the derived patterns. A page layout may be defined by an arrangement of regions, where each region may be of a particular type (e.g., body text, body text paragraphs, captions, image/graphical regions, chapter headings, headers, footers, footnotes, tables, list items, equations [e.g., math equations, chemical formulas, etc.], table of contents [TOC] entries, etc.). In one embodiment, a computer system identifies regions (e.g., paragraphs, footnotes, chapter headings, tables, etc.) of a page of an electronic media item, and collects historical data pertaining to various typographical features of page regions (e.g., indentation, font size, line spacing, character spacing, etc.). The historical data may be, for example, a set of histograms that count the number of samples having particular typographical feature values, or moments of a probability distribution for the value of a typographical feature, or parameters of a learning machine, etc. The computer system may then identify the type of each page region based on the typographical features of the page, the historical data, and, optionally, the position and dimensions of the region.

A user may subsequently examine the pages of the electronic media item via a graphical editor to determine whether the computer system correctly identified the page regions and region types. When the user recognizes an error (e.g., a chapter heading erroneously included in a region corresponding to the first paragraph, a footnote region erroneously identified as a paragraph region, etc.), the user can make necessary corrections to the page via the graphical editor (e.g., via mouse selections or clicks, keyboard input, touch screen input, stylus input, etc.).

Figure 1:
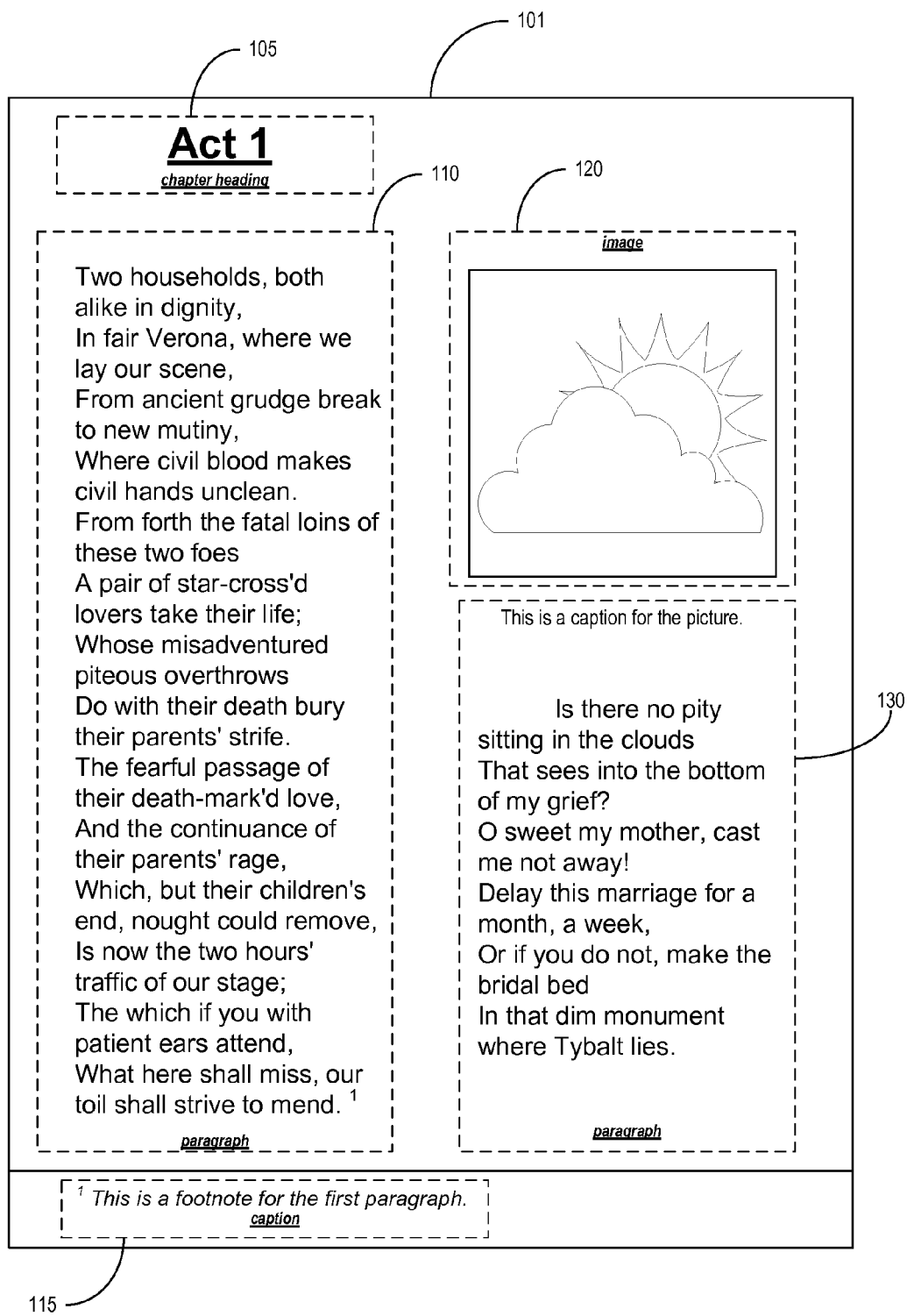
FIG. 1 depicts an illustrative computer-generated identification of regions and region types for a page of an electronic media item, in accordance with one embodiment of the present disclosure.

For example, FIG. 1 depicts an illustrative computer-generated identification of regions and region types for an exemplary page 101 of an electronic media item, as displayed in a graphical editor, in accordance with one embodiment of the present disclosure. As shown in FIG. 1, a computer system has identified regions 105, 110, 115, 120, and 130 in page 101, as well as region types for each of these regions. Region 105 has been identified as a chapter heading region; region 110 has been identified as a paragraph region; region 115 has been identified as a caption region; region 120 has been identified as a graphic or image region; and region 130 has been identified as a paragraph region.

As shown in FIG. 1, region 115 is actually a footnote for the page 101, but the computer system has incorrectly identified region 115 as a caption region. Similarly, region 130 has also been incorrectly identified. Region 130 includes a caption region (e.g., the text "This is a caption for the picture."), but the caption region was incorrectly included in paragraph region 130.

Figure 2:
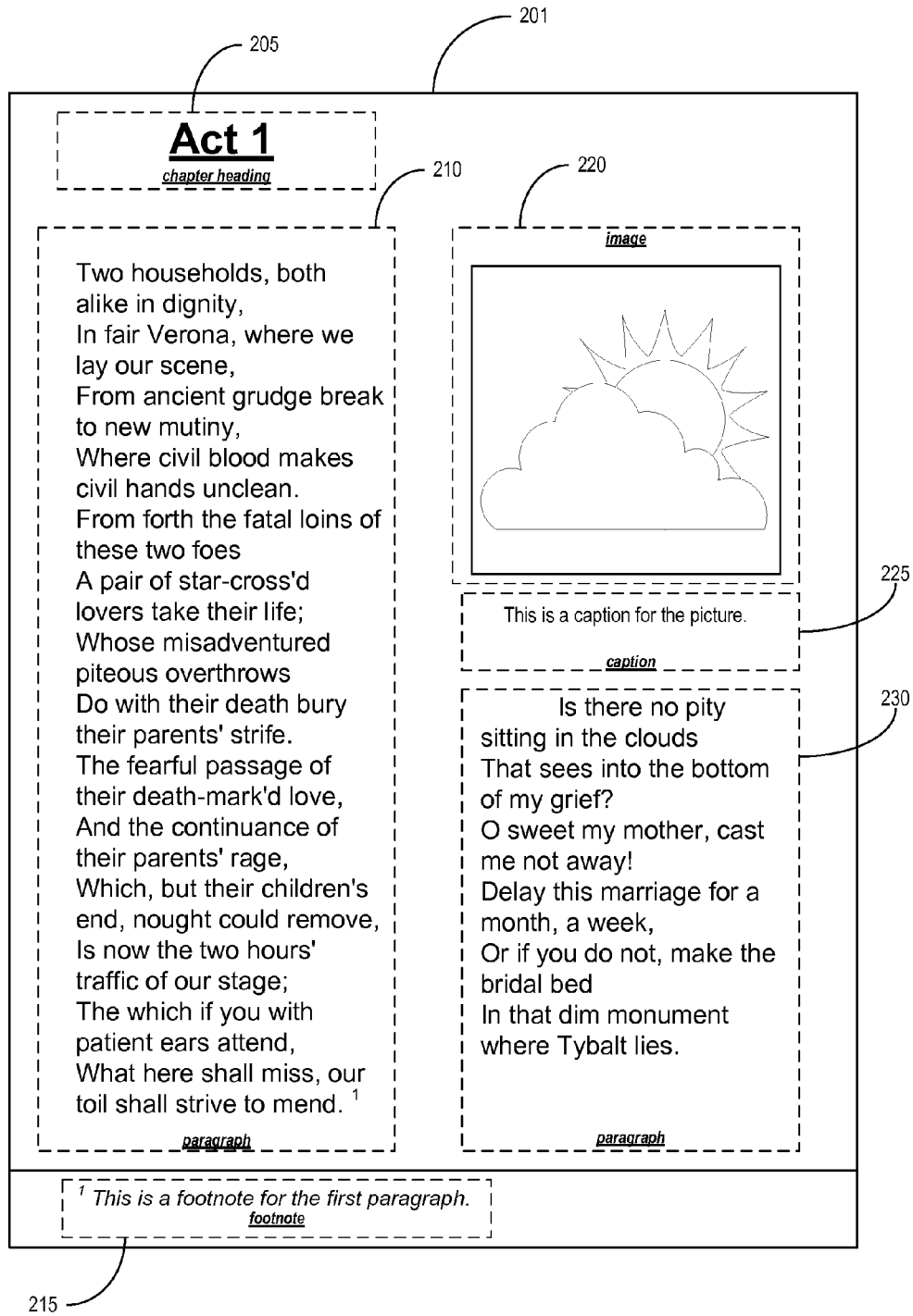
FIG. 2 depicts the page of FIG. 1 after correction by a user, in accordance with one embodiment of the present disclosure.

FIG. 2 depicts a page 201, which corresponds to page 101 after it has been corrected by a user via the graphical editor, in accordance with one embodiment of the present disclosure. As shown in FIG. 2, region 205, which corresponds to region 105 of page 101, was not changed by the user. Similarly, regions 210 and 220, which correspond to regions 110 and 120, respectively, were not changed by the user. Region 215 has the same size and position as region 115, however the user has changed the region type from caption to footnote. The user has also split up region 130 of page 101 into two regions 225 and 230, where region 225 contains the caption for image 220 and region 230 contains the paragraph of region 130, without the caption.

In one embodiment of the present disclosure, whenever a page is corrected by a user via the graphical editor, the historical data are updated accordingly based on the corrections, and when the user leaves a page unchanged in the graphical editor, the historical data are also left unchanged. In another embodiment, the historical data are updated every time a user leaves a page (e.g., to move to another page, etc.) via the graphical editor, regardless of whether or not any corrections were made to the page. The update may involve an "unlearning" process to prevent overweighting, in the historical data, pages that are visited in the graphical editor more than once by a user, without the user making corrections each visit. For example, a user might navigate to a particular page in the graphical editor and make corrections to the page, and subsequently return to that page in the graphical editor one or more additional times to view the page, without making any further changes to the page (e.g., additional corrections, undoing prior corrections, etc.). Consequently, in accordance with this embodiment, when a user first navigates to a page in the graphical editor, the historical data associated with the page are deleted (e.g., they are "unlearned" or "undone"), thereby canceling out the updating to the historical data that occurs when a user leaves a page without making changes.

Embodiments of the present disclosure can thus improve the accuracy with which a computer system edits page layouts by "learning" from human-made corrections made in the graphical editor. Accurate page layouts that include proper regions and region types can substantially improve a user's reading experience, as it enables the user to navigate more easily through the electronic media item (e.g., navigate by chapters, navigate by sections, etc.), access content more rapidly (e.g., select an entry in a table of contents to read a particular section of an e-book, etc.), browse the item by region types (e.g., go from footnote to footnote, image caption to image caption, etc.), and display only selected region types (e.g., a user may choose not to display any footnote regions and image regions, etc.). It should be noted that although embodiments of the present disclosure are disclosed in the context of pages of an electronic media item, techniques of the present disclosure may also be employed for the general case of blocks of media, which may or may not correspond to pages. It should further be noted that in some embodiments, the pages or blocks of media may not necessarily be obtained via scanning of a physical media item (e.g., an electronic media item may be composed directly via a computer, rather than being scanned from a physical media item).

Figure 3:
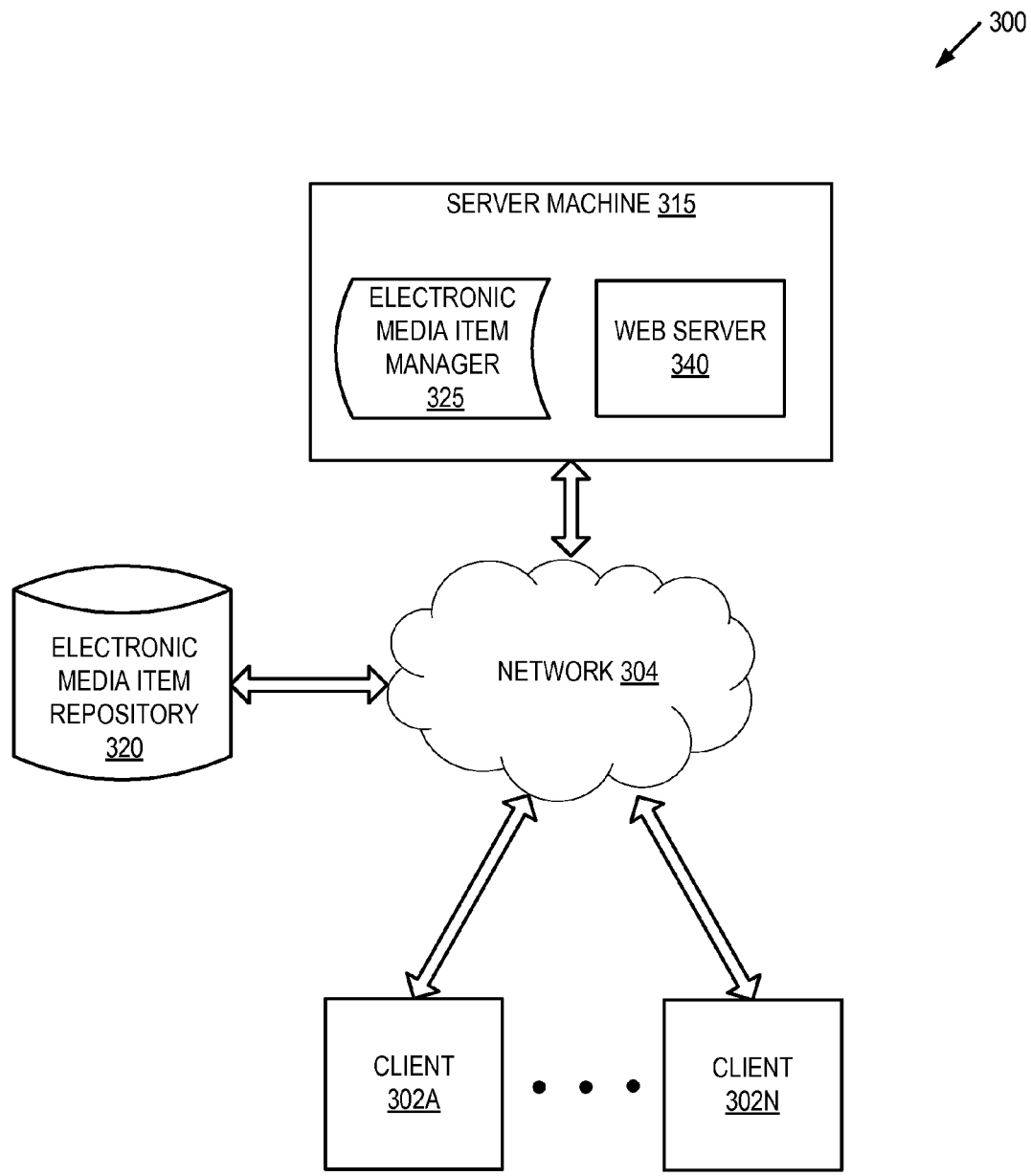
FIG. 3 illustrates an exemplary system architecture, in accordance with one embodiment of the present disclosure.

FIG. 3 illustrates an example system architecture 300, in accordance with one embodiment of the present disclosure. The system architecture 300 includes a server machine 315, an electronic media item repository 320 and client machines 302A-302N connected to a network 304. Network 304 may be a public network (e.g., the Internet), a private network (e.g., a local area network (LAN) or wide area network (WAN)), or a combination thereof.

The client machines 302A-302N may be wireless terminals (e.g., smartphones, etc.), personal computers (PC), laptops, tablet computers, or any other computing or communication devices that are capable of running an e-reader application, or may be dedicated e-reader devices. The client machines 302A-302N may run an operating system (OS) that manages hardware and software of the client machines 302A-302N. A browser (not shown) may run on the client machines (e.g., on the OS of the client machines). The browser may be a web browser that can access webpages to search for and purchase electronic media items. The client machines 302A-302N may also upload electronic media items (e.g., self-published and -authored e-books, etc.) to the web server for approval by an administrator or curator, and when approved, stored in electronic media item repository 320.

Server machine 315 may be a rackmount server, a router computer, a personal computer, a portable digital assistant, a mobile phone, a laptop computer, a tablet computer, a camera, a video camera, a netbook, a desktop computer, a media center, or any combination of the above. Server machine 315 includes a web server 340 and an electronic media item manager 325. In alternative embodiments, the web server 340 and electronic media item manager 325 may run on different machines.

Electronic media item repository 320 is a persistent storage that stores electronic media items such as e-books, electronic magazines, electronic newspapers, and so forth, as well as data structures to tag, organize, and index this information. In some embodiments, the electronic media items may also include digital video (e.g., movies, television, short clips, etc.), images (e.g., art, photographs, etc.), audio files, and other types of multimedia content. In some embodiments, electronic media item repository 320 might be a network-attached file server, while in other embodiments electronic media item repository 320 might be some other type of network-based or local persistent storage comprising a relational database, an object-oriented database, etc. Electronic media item repository 320 may be hosted by the server machine 315 or one or more different machines coupled to the server machine 315 via the network 304. The electronic media items stored in the electronic media item repository 320 may include items provided by service providers such as news organizations, publishers, libraries, and so forth, as well as user-generated items uploaded by client machines 302.

Web server 340 may serve web pages and data pertaining to electronic media item repository 320 to clients 302A-302N, and may receive search queries and purchase transaction information from clients 302A-302N, as well as self-published and -authored electronic media items for approval and storage in electronic media item repository 320.

In accordance with some embodiments, electronic media item manager 325 is capable of processing pages of electronic media items stored in the electronic media item repository 320, of managing historical data pertaining to pages that have been processed previously by electronic media item manager 325, of determining typographical features of pages, of identifying regions and region types of pages of electronic media items based on their typographical features and the historical data, and of managing a graphical editor that enables a user (e.g., an administrator, etc.) to view the region and region type identifications generated by electronic media item manager 325 and correct these identifications, if necessary. An embodiment of electronic media item manager 325 is described in detail below with respect to FIG. 4.

Figure 4:
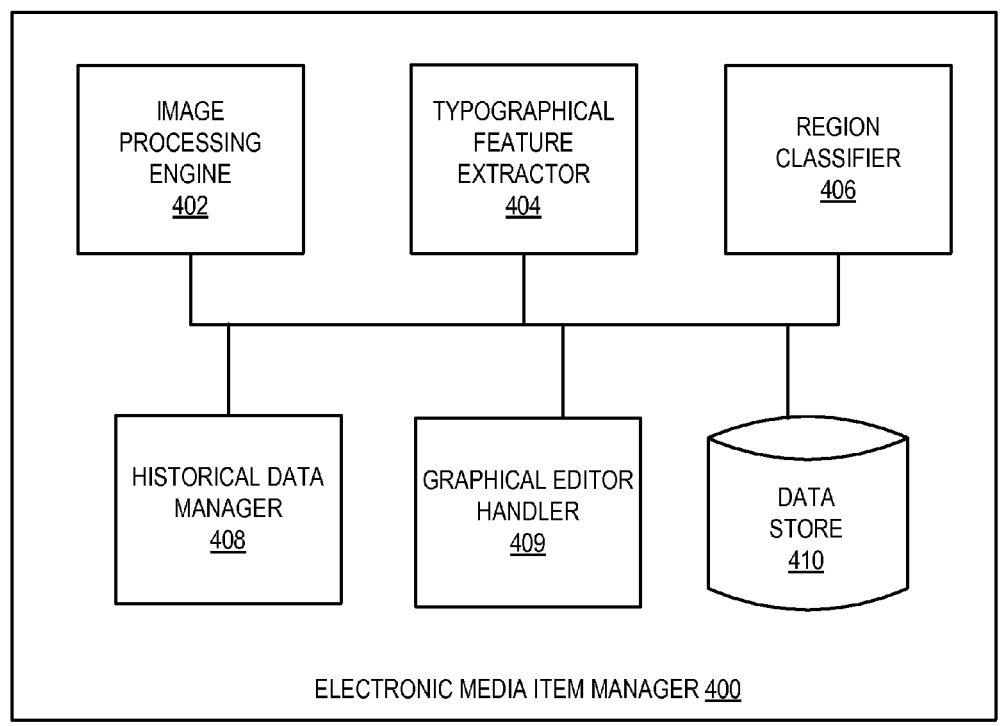
FIG. 4 is a block diagram of one embodiment of a content sharing manager.

FIG. 4 is a block diagram of one embodiment of an electronic media item manager 400. The electronic media item manager 400 may be the same as the electronic media item manager 325 of FIG. 3 and may include an image processing engine 402, a typographical feature extractor 404, a region classifier 406, a historical data manager 408, a graphical editor handler 409, and a data store 410. The components can be combined together or separated in further components, according to a particular embodiment.

The data store 410 may include one or more temporary buffers and/or one or more permanent data stores to hold pages of electronic media items, historical data obtained from pages processed by electronic media item manager 400, data structures for organizing and indexing items in electronic media item repository 120, web pages that are served to users of client machines 302A-302N, graphical editor data (e.g., for correcting regions and region types identified by electronic media item manager 400, etc.), or some combination of these data. Data store 410 may be hosted by one or more storage devices, such as main memory, magnetic or optical storage based disks, tapes or hard drives, NAS, SAN, and so forth.

The image processing engine 402 is software and/or hardware that processes scanned images of pages and determines the positions and dimensions of bounding boxes (e.g., rectangles that surround page regions) via one or more techniques such as segmentation, white space analysis, etc. Typographical feature extractor 404 is software and/or hardware that obtains one or more typographical features (e.g., indentation, font size, line spacing, character spacing, etc.) of page regions. For example, in some embodiments typographical feature extractor 404 may employ an optical character recognition (OCR) engine that recognizes characters and works in conjunction with image processing engine 402 to determine font size based on the pixels of a character. Similarly, features such as indentation, line spacing, and so forth may be determined based on "blank" pixels (e.g., pixels that have the same color as the background color) in margins, between lines, and so forth that are identified by image processing engine 402.

Region classifier 406 is software and/or hardware that determines region types for regions of a page, based on typographical features of the page and historical data stored in data store 410. For example, in some embodiments region classifier 406 may be a learning machine that is trained to classify regions based on typographical features, while in some other embodiments region classifier 406 may employ rules that map typographical features to region types, while still other embodiments may employ some other technique (e.g., clustering, etc.) to classify regions.

Historical data manager 408 is software and/or hardware that maintains historical data pertaining to pages of electronic media items processed by electronic media item manager 400. For example, in some embodiments the historical data may comprise one or more histograms that count the number of samples having particular typographical feature values, while in some other embodiments the historical data may be in some other form (e.g., moments of a probability distribution for the value of a typographical feature, parameters of a learning machine, etc.). Graphical editor handler 409 is software and/or hardware that manages a graphical editor by which a user (e.g., an administrator, etc.) can view pages that have been processed by electronic media item manager 400, and can correct, if necessary, regions and/or region types incorrectly identified by electronic media item manager 400. Some operations of image processing engine 402, typographical feature extractor 404, region classifier 406, historical data manager 408, and graphical editor handler 409 are described in more detail below with respect to FIGS. 5 and 6.

Figure 5:
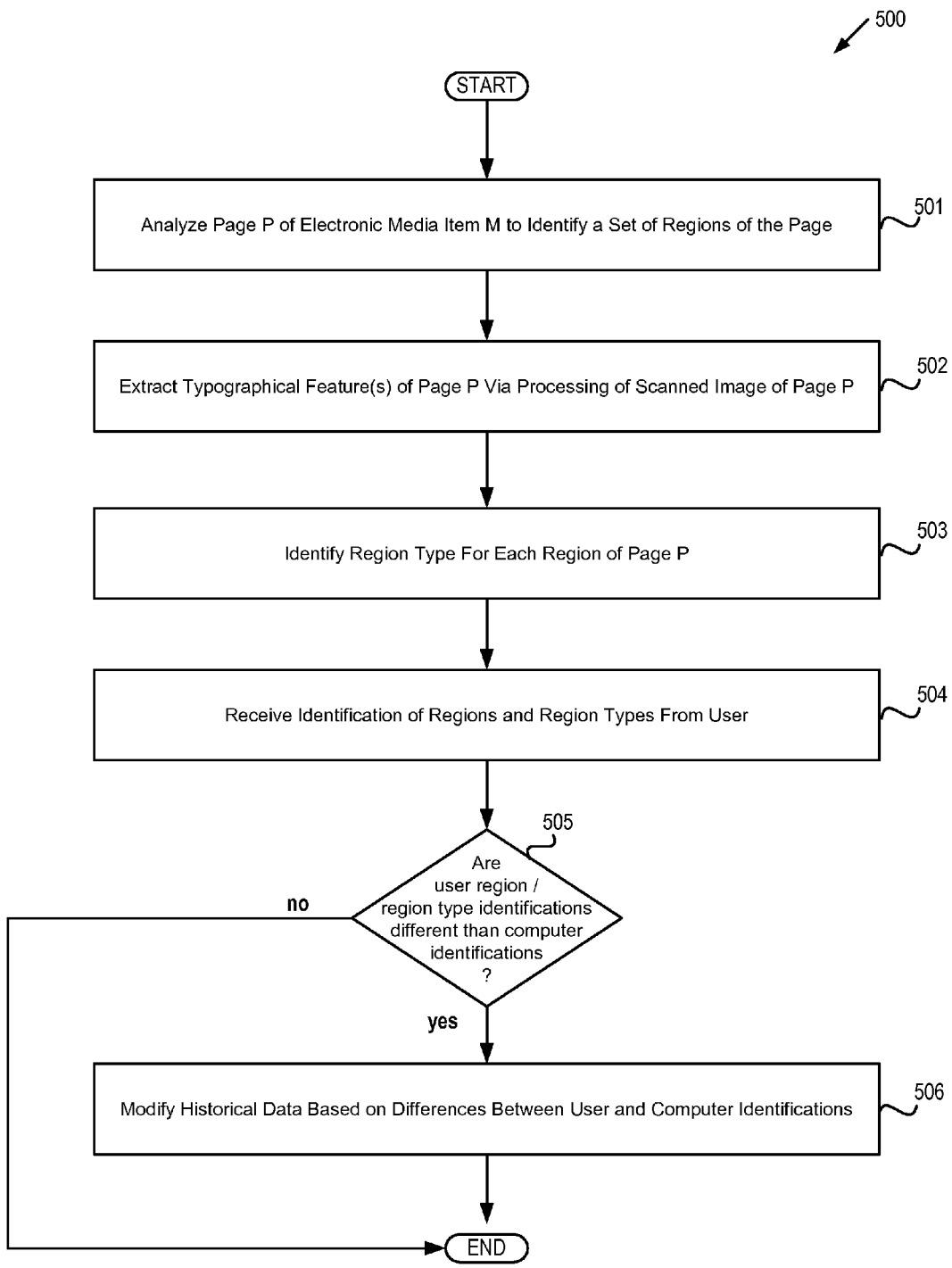
FIG. 5 depicts a flow diagram of one embodiment of a first method for improving automated identification of regions and region types of electronic media item pages.

FIG. 5 depicts a flow diagram of one embodiment of a first method 500 for improving automated identification of regions and region types of electronic media item pages. The method is performed by processing logic that may comprise hardware (circuitry, dedicated logic, etc.), software (such as is run on a general purpose computer system or a dedicated machine), or a combination of both. In one embodiment, the methods are performed by the server machine 315 of FIG. 3, while in some other embodiments, one or more operations of the method might be performed by another machine. It should be noted that in some embodiments, various components of content electronic media item manager 400 may run on separate machines.

At block 501, a page P of an electronic media item M is analyzed to identify a set of regions of the page. In one embodiment, the regions are identified by image processing engine 402 of electronic media item manager 400, which processes a scanned image of the page to determine the positions and dimensions of bounding boxes surrounding page regions (e.g., via segmentation, via white space analysis, etc.). It should be noted that in some other embodiments, region identification may be performed using some other technique (e.g., via clustering of similar typographical features, rule-based identification, etc.), or may also be based on typographical features and/or historical data, as is the case when identifying region types, at block 503 below.

At block 502, one or more typographical features of page P (e.g., indentation, font size, line spacing, character spacing, etc.) are extracted via processing of the scanned image of the page. In one embodiment, block 502 is performed by typographical feature extractor 404 of electronic media item manager 400.

At block 503, a region type is identified for each of the regions of page P. In one embodiment, this identification is based on one or more typographical features of the page, historical data obtained from other pages (e.g., from other pages of the same electronic media item, from pages of other electronic media items of the same type as item M, etc.), and, optionally, the position and dimensions of the region (e.g., a footnote region is typically at the bottom of the page, a caption region typically has a small vertical height, etc.). It should be noted that in some embodiments, one or more of the regions of page P may be assigned a region type of 'unknown' when the identification is inconclusive.

In one embodiment, the historical data are represented via a set of histograms $\{H_1, \ldots, H_n\}$, where n is a positive integer. In one such embodiment, each histogram $H_k$, $1 \leq k \leq n$, corresponds to a respective typographical feature $f_k$, and each bin of histogram $H_k$ corresponds to a triple (r, lowerVal_$f_k$, upperVal_$f_k$), where:

r is a region type (e.g., body text paragraph, caption, chapter heading, footnote, etc.); and lowerVal_$f_k$ and upperVal_$f_k$ define a range of values for typographical feature $f_k$.

For example, the historical data might comprise two histograms $H_1$ and $H_2$, where:

$H_1$ corresponds to font size, and the bins of $H_1$ might include (footnote, 8, 9), (footnote, 10, 11), . . . (footnote, 24, 36), (caption, 8, 9), (caption, 10, 11), . . . (caption, 24, 36), and so forth; and $H_2$ corresponds to indentation from the left margin, in millimeters, and the bins of $H_2$ might include (footnote, 0, 5), (footnote, 5, 10), . . . (footnote, 90, 100), (caption, 0, 5), (caption, 5, 10), . . . (caption, 90, 100), and so forth.

It should be noted that a feature value range may represent a single value of a feature (e.g., font size 10, etc.) by setting the lower and upper values of the feature to the same value (e.g., (footnote, 10, 10), etc.).

In one embodiment, the histogram assigns to each bin a value that indicates the number of samples in the bin. For example, a value of 17 for the bin (footnote, 8, 8) would indicate that 17 footnotes having font size 8 have been encountered so far. In one embodiment, when there is a single histogram (i.e., n=1), a region type may be identified by selecting the histogram bin that matches the typographical features of the region and has the largest bin value. For example, suppose that there is a single histogram corresponding to font size, and a region of a page has a font size of 8, and the values of bins (footnote, 8, 8), (body text, 8, 8), and (TOC, 8, 8) of the histogram are 16, 1, and 3, respectively. Then the region may be identified as a footnote, given that a font size of 8 is most frequently associated with footnotes.

In one embodiment, when there are multiple histograms (i.e., n≥2), then the results for each histogram might be combined in some fashion into a composite score. For example, if there are two histograms, one of which is the font size histogram described above, then the contribution to the composite score for region type footnote would be 16/(16+1+3)=0.8, the contribution to the composite score for region type body text would be 1/(16+1+3)=0.05, and the contribution to the composite score for region type TOC would be 3/(16+1+3)=0.15. Similarly, the second histogram (corresponding to, say, indentation) would have contributions to the composite score for each region type, and then a composite score for each region type could be obtained by combining the two contributions for that region type in some fashion (e.g., a summation, a weighted average, etc.). In one embodiment, the region types are identified by region classifier 406 of electronic media item manager 400. It should be noted that some other embodiments may employ an alternative representation of historical data, rather than histograms (e.g., moments of a probability distribution, etc.) and may identify regions types in some alternative fashion, such as via probabilistic estimation (e.g., Bayesian estimators, Kernel Density estimation, etc.) or other non-statistical techniques (e.g., non-numeric feature equality, etc.). It should further be noted that in some embodiments, one or more of the regions may be assigned a region type of 'unknown' when the identification is inconclusive (e.g., when the difference between the composite scores of the most-likely region type and the second-most-likely region type is below a threshold, etc.).

At block 504, an identification of regions in page P and their region types is received from a user. In one embodiment, the identification is received via a graphical editor that displays the page with regions and region types identified by electronic media item manager 400 (e.g., page 101 of FIG. 1), and that allows a user to make changes, if necessary (via mouse selections or clicks, keyboard input, touch screen input, stylus input, etc.) to the regions and region types (e.g., by modifying the position and/or dimensions of a bounding box for a region, by dividing a bounding box into multiple bounding boxes, by combining bounding boxes into a single bounding box, by changing a region type, etc.). In one embodiment, block 504 is performed by graphical editor handler 409 of electronic media item manager 400. It should be noted that in some embodiments, the graphical editor may assist a user in making changes to the regions and region types (e.g., via an auto-completion feature, via suggestions to a user, etc.). It should further be noted that in some embodiments, the graphical editor may provide features that enable a user to conveniently rearrange, reclassify, and correct regions and region types, and may explicitly mark regions and region types that have been changed by the user.

Block 505 branches based on whether the identification of regions and region types by the user differs in any way from the identification by electronic media item manager 400 (e.g., whether the user made any changes via the graphical editor). If so, execution continues at block 506, otherwise the method of FIG. 5 terminates.

At block 506, the historical data are modified based on the differences between the identifications by the user and electronic media item manager 400. For example, in one embodiment, if a user has changed a region type from a caption to a footnote, then the value of each histogram bin corresponding to type 'caption' and the particular typographical features of the region will be decremented, and the value of the histogram bins corresponding to type 'footnote' and the particular typographical features of the region will be incremented. In one embodiment, block 506 is performed by historical data manager 408 of electronic media item manager 400. It should also be noted that in some other embodiments, the historical data may be modified in some alternative fashion based on differences between user identifications and automated identifications.

Figure 6:
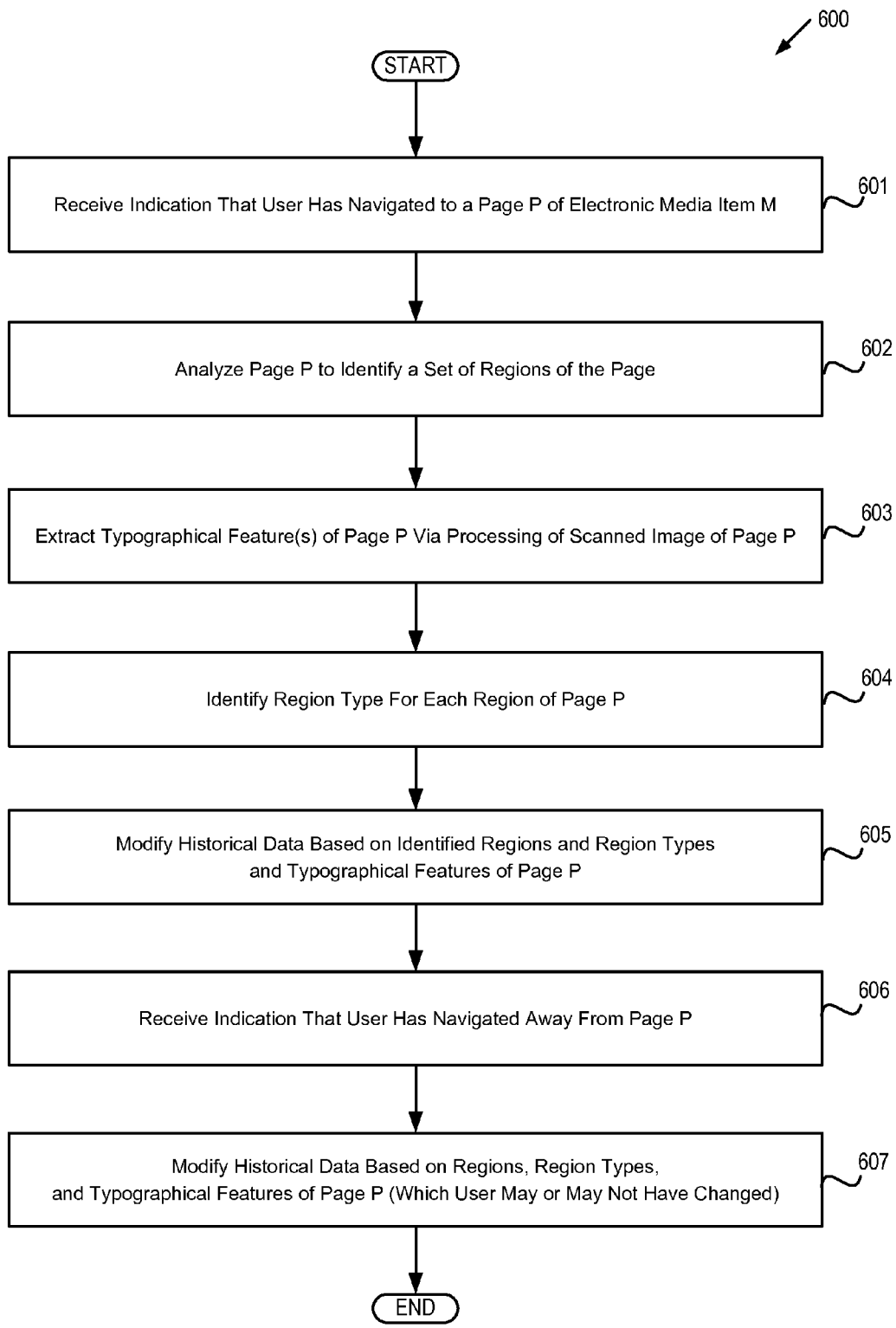
FIG. 6 depicts a flow diagram of one embodiment of a second method for improving automated identification of regions and region types of electronic media item pages.

FIG. 6 depicts a flow diagram of one embodiment of a second method 600 for improving automated identification of regions and region types of electronic media item pages. According to method 600, the historical data are updated every time a user navigates away from a page (e.g., to move to another page, etc.) via the graphical editor, regardless of whether or not any corrections were made to the page. Method 6 is intended to avoid overweighting in the historical data pages that are visited more than once by a user, without the user making corrections each visit. In particular, when a user first navigates to a page, the historical data associated with the page are deleted (e.g., they are "unlearned" or "undone"), thereby canceling out the updating to the historical data that occurs when a user leaves a page without making changes.

At block 601, an indication that a user has navigated to a page P of an electronic media item M is received. In one embodiment, block 601 is performed by graphical editor handler 409 of electronic media item manager 400.

At block 602, page P is analyzed to identify a set of regions of the page, as in block 501 of FIG. 5. In one embodiment, the regions are identified by image processing engine 402 of electronic media item manager 400, which processes a scanned image of the page to determine the positions and dimensions of bounding boxes surrounding page regions (e.g., via segmentation, via white space analysis, etc.). It should be noted that in some other embodiments, region identification may be performed using some other technique (e.g., via clustering of similar typographical features, rule-based identification, etc.), or may also be based on typographical features and/or historical data, as is the case when identifying region types, at block 604 below.

At block 603, one or more typographical features of the page (e.g., indentation, font size, line spacing, character spacing, etc.) are extracted via processing of the scanned image of the page, as in block 502 of FIG. 5. In one embodiment, block 603 is performed by typographical feature extractor 404 of electronic media item manager 400.

At block 604, a region type is identified for each of the regions of page P, as in block 503 of FIG. 5. In one embodiment, this identification is based on one or more typographical features of the page, historical data obtained from other pages (e.g., from other pages of the same electronic media item, from pages of other electronic media items of the same type as item M, etc.), and, optionally, the position and dimensions of the region. As in the method of FIG. 5, in one embodiment, the historical data are represented via a set of histograms $\{H_1, \ldots, H_n\}$, and the region types are identified by region classifier 406 of electronic media item manager 400. It should be noted that some other embodiments may employ an alternative representation of historical data, rather than histograms, and may identify regions types in some alternative fashion.

At block 605, the historical data are modified based on the identified region and region types and typographical features of page P. In one embodiment, data pertaining to page P are "unlearned" by decrementing the histogram bins corresponding to the appropriate typographical feature value ranges and region type. For example, if there is a footnote region with font size 9 in page P, then the bin of the histogram corresponding to region type footnote and font size 9 would be decremented in order to remove this sample from the historical data. In one embodiment, block 605 is performed by historical data manager 408 of electronic media item manager 400. It should be noted that in some other embodiments, the historical data may be modified in some alternative fashion based on the typographical features and computer-identified region types of page P.

At block 606, an indication that a user has navigated away from page P (e.g., to move to another page, etc.) is received.

In one embodiment, block 606 is performed by graphical editor handler 409 of electronic media item manager 400.

At block 607, the historical data are modified based on the regions, region types, and typographical features of page P at the time of navigation away from page P. It should be noted that block 607 is executed regardless of whether or not the user made any changes to the computer-identified regions and region types. In one embodiment, data pertaining to page P are "learned" by incrementing the histogram bins corresponding to the appropriate typographical feature value ranges and region type. For example, if there is a region in page P with font size 8 that has been identified as a footnote region, then the bin of the histogram corresponding to region type footnote and font size 8 would be incremented in order to add this sample to the historical data. In one embodiment, block 607 is performed by historical data manager 408 of electronic media item manager 400. It should be noted that in some other embodiments, the historical data may be modified in some alternative fashion based on the typographical features and user-identified regions and region types of page P.

Figure 7:
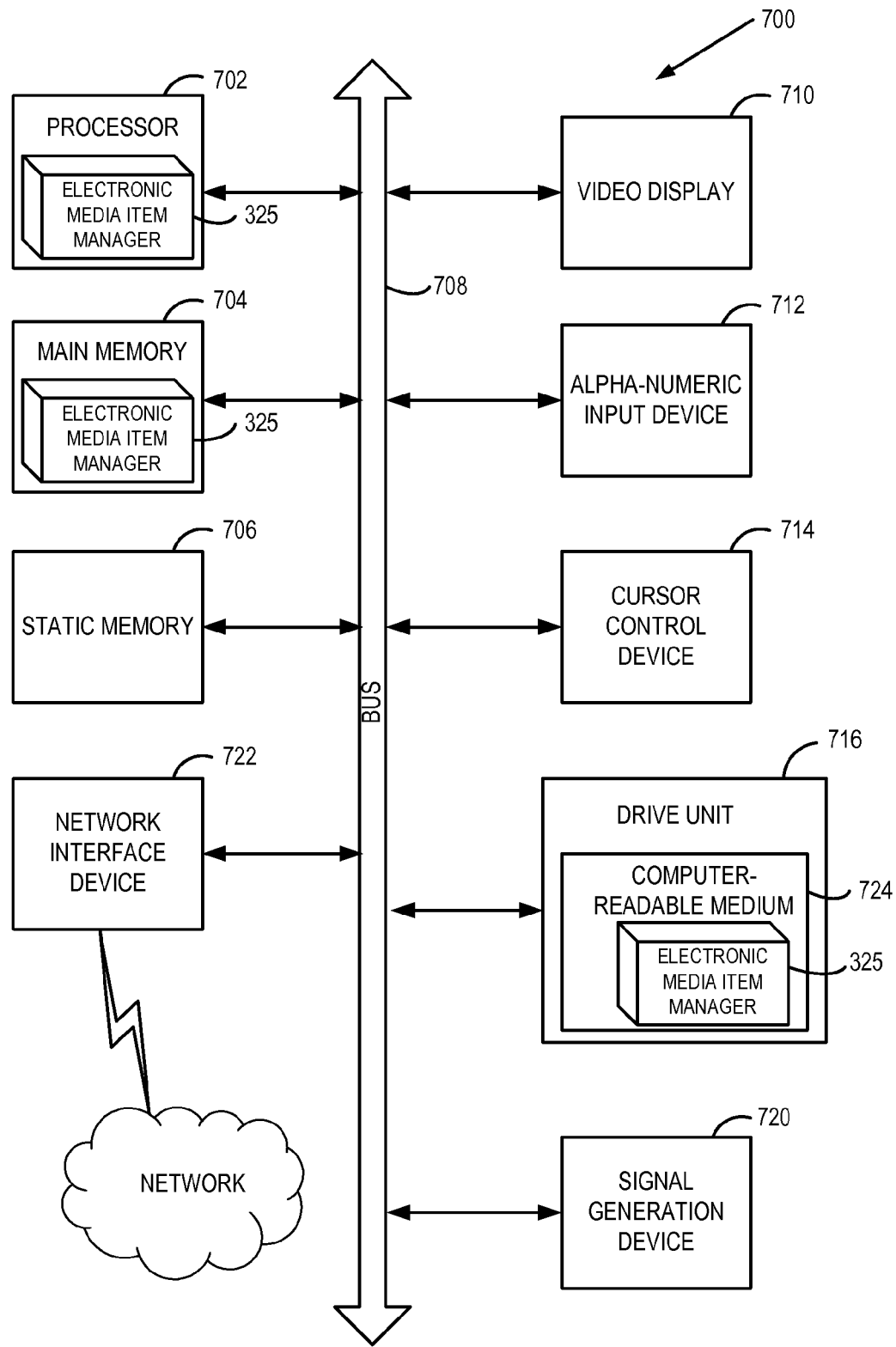
FIG. 7 depicts a block diagram of an illustrative computer system operating in accordance with embodiments of the invention.

FIG. 7 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions of electronic media item manager 325 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable medium 724 on which is stored one or more sets of instructions of electronic media item manager 325 embodying any one or more of the methodologies or functions described herein. Instructions of electronic media item manager 325 may also reside, completely or at least partially, within the main memory 704 and/or within the processor 702 during execution thereof by the computer system 700, the main memory 704 and the processor 702 also constituting computer-readable media. Instructions of electronic media item manager 325 may further be transmitted or received over a network via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "receiving," "modifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, video clips (e.g., images, audio clips, textual documents, web pages, etc.). The scope of the invention should, therefore, be determined with reference to the appended claims, along with the full scope of equivalents to which such claims are entitled.

What is claimed is:

1. An apparatus comprising:
    a memory to store pages of an electronic media item; and
    a processor to:
        identify a first set of regions of a first page of the electronic media item and respective region types for the first set of regions, wherein the identifying of the respective region types for the first set of regions is based on one or more typographical features of the first page and on a set of histograms obtained from pages of other electronic media items, and wherein the set of histograms indicates associations between region types and typographical features in the pages of the other electronic media items,
        receive user input pertaining to at least one of the first set of regions or the respective region types of the first set of regions,
        determining whether the user input specifies at least one change to the first set of regions or the respective region types of the first set of regions,
        when the user input specifies at least one change, modifying the set of histograms based on the at least one change, and
        identify a second set of regions of a second page of the electronic media item and respective region types for the second set of regions, wherein the identifying of the respective region types for the second set of regions is based on one or more typographical features of the second page and on the modified set of histograms.

2. The apparatus of claim 1 wherein the identifying of the respective region types for the first set of regions is further based on one or more dimensions of the region.

3. The apparatus of claim 1 wherein the one or more typographical features comprise at least one of: font size, line spacing, line length, token spacing, margin size, indentation, or region area.

4. The apparatus of claim 1 wherein the respective region type comprises at least one of: a chapter heading, a graphic, a body text, a header, a footer, a table, a list item, a footnote, a table of contents entry, or an equation.

5. The apparatus of claim 1 wherein each histogram in the set of histograms comprises a plurality of bins corresponding to the respective region types and value ranges for associated typographical features.

6. A method comprising:
    identifying, by a processing device, a first set of regions of a page of an electronic media item, and a respective region type for at least one region of the first set, wherein the identifying of the respective region type is based on one or more typographical features of the page and on historical data obtained from one or more pages of one or more electronic media items;
    receiving, by the processing device, an identification by a user of a second set of regions of the page and a respective region type for at least one region of the second set; and
    modifying, by the processing device, the historical data based on a difference between the regions and respective region types of the first set, and the regions and respective region types of the second set.

7. The method of claim 6 wherein receiving the identification by the user of the second set of regions of the page and the respective region type for at least one region of the second set comprises:
    receiving user input specifying at least one of one or more user adjustments to the first set of regions or user changes to the respective region type identified by the processing device.

8. The method of claim 6 wherein receiving the identification by the user of the second set of regions of the page and the respective region type for at least one region of the second set comprises:
    determining that the user kept at least one of the first set of regions or the respective region type identified by the processing device unchanged.

9. The method of claim 6 wherein the identifying of the respective region type for a region of the first set of regions is further based on a position of the region.

10. The method of claim 6 wherein the historical data comprises a histogram, and wherein each bin of the histogram corresponds to a region type and a value range for a typographical feature.

11. The method of claim 6 wherein the one or more typographical features comprises at least one of: font size, line spacing, line length, token spacing, margin size, indentation, or region area.

12. The method of claim 6 wherein the respective region type comprises at least one of: a chapter heading, a graphic, a body text, a header, a footer, a table, a list item, a footnote, a table of contents entry, or an equation.

13. An apparatus comprising:
a memory to store a first page of a first electronic media item of a plurality of electronic media items; and
a processing device, operatively coupled with the memory, the processing device to:
identify a first set of regions of the first page and a respective region type for at least one region of the first set, wherein the identifying of the respective region type is based on one or more typographical features of the first page and on a set of histograms obtained from a plurality of pages of the plurality of electronic media items, and wherein the set of histograms comprises a plurality of bin counts for region types and typographical features in the plurality of pages,
receive a first indication that a user has navigated to the first page in a graphical editor,
decrement, in response to the first indication, a subset of bin counts within the plurality of bin counts that corresponds to the typographical features and region types of the first set of regions,
receive a second indication that the user has navigated away from the page in the graphical editor,
identify, in response to the second indication, a second set of regions of the page and a respective region type for at least one region of the second set, and
increment a subset of bin counts within the plurality of bin counts that corresponds to the typographical features and region types of the second set of regions.

14. The apparatus of claim 13 wherein the processing device is to identify the second set of regions of the page in response to one or more user adjustments to the first set of regions.

15. The apparatus of claim 13 wherein the processing device is to identify the respective region type for a region of the second set in response to a user change of the respective region type identified by the processing device.

16. The apparatus of claim 13 wherein the identifying of the respective region type for a region of the first set is further based on one or more dimensions of the region.

17. The apparatus of claim 13 wherein the one or more typographical features comprises at least one of: font size, line spacing, line length, token spacing, margin size, indentation, or region area.

18. The apparatus of claim 13 wherein the respective region type comprises at least one of: a chapter heading, a graphic, a body text, a header, a footer, a table, a list item, a footnote, a table of contents entry, or an equation.

19. A non-transitory computer-readable storage medium storing instructions which, when executed, cause a processing device to perform operations comprising:
identifying, by the processing device, a first set of regions of a first page of an electronic media item, and a respective region type for at least one region of the first set of regions, wherein the identifying of the respective region type is based on one or more typographical features of the first page and on historical data obtained from one or more pages of one or more electronic media items;
receiving, by the processing device, an identification by a user of a second set of regions of the first page and a respective region type for at least one region of the second set of regions;
modifying, by the processing device, the historical data based on a difference between the regions and respective region types of the first set, and the regions and respective region types of the second set; and
identifying, by the processing device, a third set of regions of a second page of the electronic media item, and a respective region type for at least one region of the third set of regions, wherein the identifying of the respective region type is based on one or more typographical features of the second page and on the modified historical data.

20. The non-transitory computer-readable storage medium of claim 19 wherein receiving the identification by the user of the second set of regions of the page and the respective region type for at least one region of the second set comprises:
receiving user input specifying at least one of one or more user adjustments to the first set of regions or user changes to the respective region type identified by the processing device.

21. The non-transitory computer-readable storage medium of claim 19 wherein receiving the identification by the user of the second set of regions of the page and the respective region type for at least one region of the second set comprises:
determining that the user kept at least one of the first set of regions or the respective region type identified by the processing device unchanged.

22. The non-transitory computer-readable storage medium of claim 19 wherein the identifying of a respective region type for a region of the first set of regions is further based on a position of the region.

23. The non-transitory computer-readable storage medium of claim 19 wherein the historical data comprises a histogram, and wherein each bin of the histogram corresponds to a region type and a value range for a typographical feature.

24. The non-transitory computer-readable storage medium of claim 19 wherein the one or more typographical features comprises at least one of: font size, line spacing, line length, token spacing, margin size, indentation, or region area.

25. The non-transitory computer-readable storage medium of claim 19 wherein the respective region type comprises at least one of: a chapter heading, a graphic, a body text, a header, a footer, a table, a list item, a footnote, a table of contents entry, or an equation.

* * * * *